Sept. 29, 1959   K. B. THOMPSON   2,906,161
OPTICAL SYSTEM FOR ALIGNMENT INSPECTION
Filed March 29, 1954   2 Sheets-Sheet 1
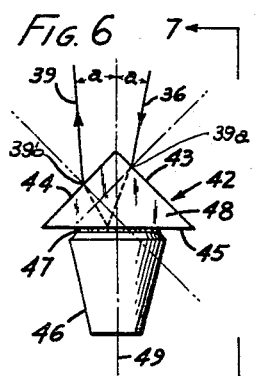
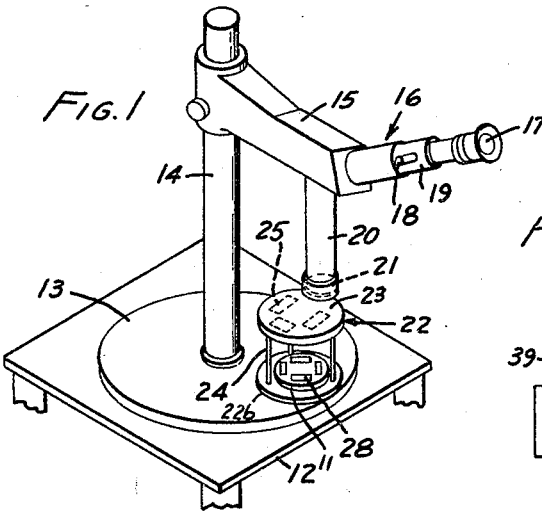
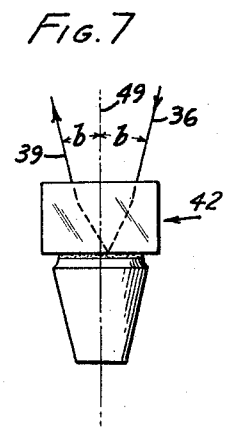
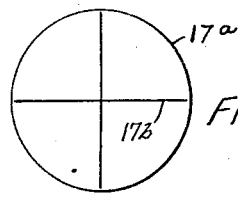
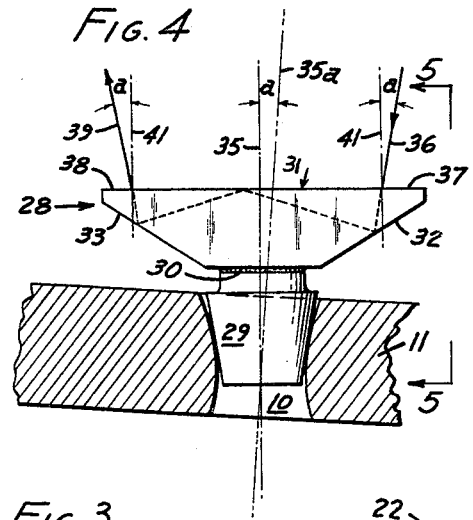
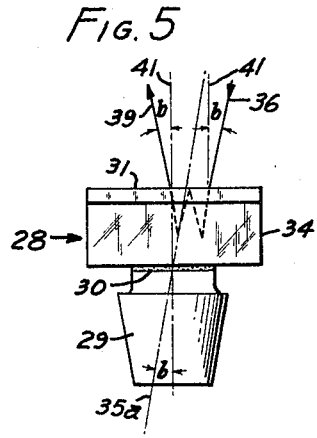
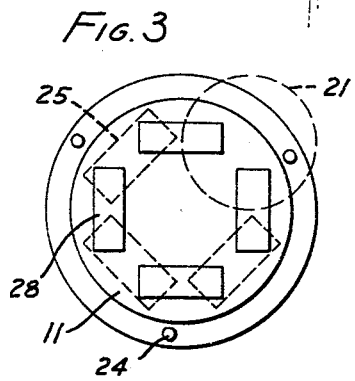
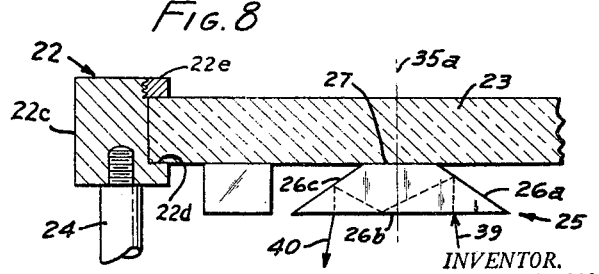
INVENTOR.
KENNETH B. THOMPSON
BY Gordon Argus
ATTORNEY.

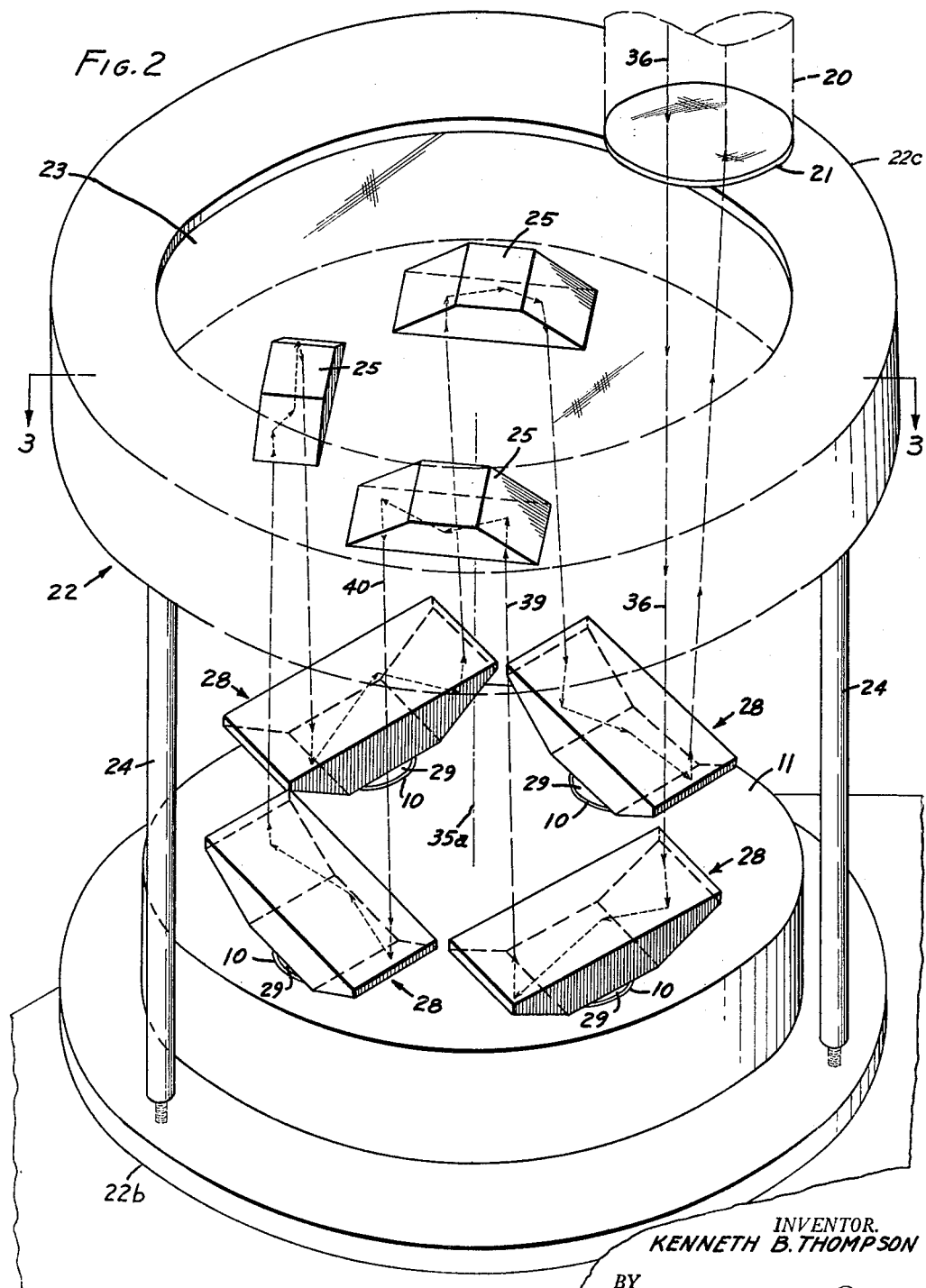

United States Patent Office 2,906,161
Patented Sept. 29, 1959

2,906,161

OPTICAL SYSTEM FOR ALIGNMENT INSPECTION

Kenneth B. Thompson, Sierra Madre, Calif., assignor to Penn Optical & Instrument Co., Pasadena, Calif., a corporation of California Application March 29, 1954, Serial No. 419,470

12 Claims. (Cl. 88—14)

This invention pertains to the detection and measurement of alignment errors or deviations of elements; and has for an object to provide means for quickly and easily making a visual determination of the malalignment of an element with respect to an axis. A related object is to provide means for determining the cumulative malalignment of a plurality of such elements.

It is sometimes desirable to check the alignment of elements such as nozzle openings and the like, not merely with regard to the alignment of each individual element with respect to some arbitrary true or reference axis in the plate, but also to determine the cumulative error or deviation among a number of such elements. In rocket nozzles, for instance, the malalignment of a nozzle with respect to an axis of the nozzle plate causes a sidewise force component to be exerted on the rocket when it is fired. Rockets are sometimes provided with a number of nozzles in a single plate. In such cases the vector resultant of all the malalignments is more serious than the malalignment of a single nozzle, since this resultant is proportional to and in the same direction as the actual sidewise force which will be exerted on the rocket in flight.

The invention is carried out by associating a malalignment-sensitive reflecting means with each element whose alignment is to be checked. This malalignment-sensitive reflecting means has a reflecting surface which is perpendicular to the axis of the element, and has the property of reflecting an incident light ray with a lateral displacement between the incident and reflected rays, and such that the reflected ray makes an angle with a true or reference axis. The emergent ray departs from the malalignment-sensitive reflecting means at an angle relative to the reference axis which differs from the angle between the incident ray and the reference axis by an increment which is proportional to the malalignment of the element to which the particular reflecting means is attached. A directive light source such as a collimator directs an incident light ray so that it falls upon this reflecting means and undergoes the described deviation and lateral displacement.

The reflected rays are thereby provided with an angular deviation which is proportional to, and in the same direction as, the malalignment of the element. The magnitude and direction of the malalignment can readily be determined by measuring the angle between the incident and reflected rays.

An optional feature resides in providing means for vectorially summing the malalignments of a plurality of such elements. For this purpose, each element is provided with a malalignment-sensitive reflecting means as described above. Transfer means are related to at least some of the pairs of adjacent malalignment-sensitive reflecting means; and the light source or collimator means is related to another pair of malalignment-sensitive reflecting means. The light from the directive light source or collimator is directed into the first of the malalignment-sensitive reflectors. Each transfer means is a reflector which has the property of reflecting an incident ray with a lateral displacement between the incident and reflected rays, and the reflected ray makes an angle with a true or reference axis which differs from the angle between the incident ray and the reference axis by an increment which is proportional to the malalignment of the element to which the particular malalignment-sensitive reflecting means is attached. Therefore as the beam proceeds through this system from one malalignment-sensitive reflecting means to another, through intervening transfer means, each malalignment-sensitive reflecting means exerts an effect on the beam which is proportional to the malalignment of the element to which it is attached. Of course, if an element is accurately aligned, then all that the malalignment-sensitive reflecting means does is to reflect the beam at the same angle to the reference axis as was made between the incident beam and the reference axis.

Preferably the transfer means will be so disposed as to send the reflected ray out at an angle with the reference axis equal to the angle between the incident ray and said reference axis. The transfer means thus sends its reflected ray into the next adjacent malalignment-sensitive means. The light rays pass through malalignment-sensitive reflectors and transfer means in alternate succession, and then back to the collimator, where the resultant angular deviation of the rays can be observed. This permits a determination of the resultant malalignment of all the elements.

The above and other features of the invention will be fully understood from the following detailed description and the accompanying drawings, of which:

Fig. 1 is a perspective view of an inspection instrument incorporating an optical system according to this invention;

Fig. 2 is an enlarged perspective view of a portion of Fig. 1 showing the optical path outside the light source;

Fig. 3 is a view taken at line 3—3 of Fig. 2, partly in phantom line to show the relative positions of some of the components;

Fig. 4 is an elevation, partly in cross-section, showing a malalignment-sensitive reflecting means from Fig. 1, above an element to be checked for malalignment;

Fig. 5 is a partial side view, taken at line 5—5 of Fig. 4;

Fig. 6 is an end elevation showing another type of malalignment-sensitive reflecting means suitable for use with the instrument of Fig. 1;

Fig. 7 is a view taken at line 7—7 of Fig. 6;

Fig. 8 is a view, partly in cross-section, of a fragment of Fig. 2; and

Fig. 9 is a plan view of a target.

Referring to the drawings, an optical system for checking the malalignment of a plurality of ports 10 in a plate 11 may conveniently be set up on a table 12. A stand 13 on the table is fixed so as to provide a jig for holding the plate 11 in its proper inspection position. A post 14 rises from the table and has a horizontal arm 15 to hold a directive light source such as an autocollimator 16 above the work. This autocollimator is a conventional and well-known piece of optical equipment, and need not be described in detail. It commonly has an eyepiece 17 with a target reticle or other comparator means therein. One such target reticle or comparator means comprises the glass disc 17a shown in Fig. 9, which may conveniently be frosted, and have crossed reference lines 17b thereon. A light source 18 projects from the side of a support tube 19. A housing 20 extends downward from the arm 15, and holds a collimator objective lens 21. This lens is preferably held in the housing so that its central axis is accurately parallel to some true axis, or if the elements The optical properties of the isosceles prism of Fig. 4 will be appreciated from the drawings. Lines 41 are drawn normal to the first surface 31 of the prisms, and therefore are parallel to the central axis 35 of the port. It follows that lines 41 will make an angle with line 35a (the direction of a reference axis) which is equal to the angle of non-perpendicularity of the port 10 with respect to the plate. Lines 41 also make that same angle with rays 36 when the rays 36 are maintained parallel to the lines 35a by the instrument.

Assuming for the moment that the central axis of the hole is slightly non-perpendicular to the plate in which it is formed, so as to make an angle $a$ with a true or reference axis in the plane of Fig. 4, and an angle $b$ in the plane of Fig. 5, then the beams 36 from the autocollimator objective lens will not enter the prism normal to surface 31, since the first surface 31 will be slightly tipped. Instead the rays 36 will make an angle $\alpha$ with the normal lines 41 as seen in Fig. 4, and an angle $b$ with the lines 41 as seen in Fig. 5.

With respect to the reflections as seen in Fig. 4, the rays 36 enter at the angle $a$ and are refracted in the prism when the port is not perpendicular to the plate. If the axis of the port is perpendicular to the plate, then the rays enter normally, and there is, of course, no refraction. In either case, they thereupon strike surfaces 32, 31 and 33 in that order inside the prism, making total reflections at each surface. If the angles resulting from the choice of prism dimensions are not such as to guarantee total reflection, then these surfaces can be silvered in the region where the light rays are to be reflected.

Since the surfaces 32 and 33 make equal angles with surface 31, the emergent ray 39 leaves the surface 39 at an angle $a$ with respect to lines 41 on the opposite side thereof from the incident rays, as seen in Fig. 4. Any refractive effect on departure will be equal and opposite to that which occurred on entry, and will therefore be "cancelled out." The emergent ray 39 will also have been displaced sideward and will leave the isosceles prism at a different place from that at which it entered.

Since all the reflecting surfaces are perpendicular to a common plane, the effect on the rays as seen in the view of Fig. 4 is similar, the emergent ray making an equal and opposite angle $b$ with lines 41 from the incident ray. It is also displaced sideward.

Therefore the actual deviation of the incident rays 36 is directly proportional in angular magnitude to the malalignment of the element, and is in the same direction as the malalignment. It will be appreciated that both the magnitude and direction of the malalignment of the port 10 can be detected by measuring the direction and amount of deviation between the emergent rays 39 and the incident rays 36. This is conveniently accomplished by returning the rays 39 to the autocollimator objective lens 21. These rays, being focused at the eyepiece, will be displaced to one side of the field therein if the rays were given a deviation.

It will also be appreciated that, should rays 36 not be parallel to the reference axis, then the emergent ray will be deviated by an additional angle proportional to the angle between the rays 36 and the line 35a. However, such an angle is detectable and measurable so that the parallelism of rays 36 and the reference axis is a preferable, although not a necessary feature of the invention.

In the event that each port were to be individually checked in this manner without the use of transfer means, the resultant could be computed by a vectorial summation of all of the individual malalignments. However, this is a time-consuming process which can be avoided by sending the deviated ray from one prism into the next succeeding prism, after deviating it by an angle proportional to the angular deviation from previous malalignment-sensitive reflecting means by use of transfer means. The succeeding malalignment-sensitive reflecting means will operate to deviate this ray according to the malalignment of the element with which it is associated, and the emergent rays from the second prism have a deviation which is the resultant of the effects of the two prisms, which effects are determined by the alignment of the ports. This same arrangement can be provided for any number of elements to be checked. As stated above, the malalignment-sensitive reflecting means will reflect an emergent ray at an angle to the true reference axis which differs from the angle between the incident ray on the means and the reference axis by an increment which is proportional to the malalignment of the central axis of the element to which the particular malalignment-sensitive reflecting means is attached. Stated more simply, these isosceles prisms have the reflecting property of a plane mirror, and the angle of incidence thereon always equals the angle of reflection. Now if the central axis of the element being checked is parallel to the reference axis 35a, then the reflecting surface 31 will be normal to that axis, and the angle between an incident ray and the reference axis, and an angle between the emergent ray and the reference axis will be equal. If, however, surface 31 is tilted because the central axis 35 of the element is malaligned, the emergent ray will be differently directed (the incident ray being directed as before). The direction of the emergent ray will differ from the direction which would have been taken by a ray if the element had been aligned, by an increment equal to twice the angle of malalignment, and the angle between the emergent ray and the reference axis will therefore differ from the angle between the incident ray and the reference axis by that increment. It will be recognized that, in describing and calculating the increment and the resulting angles, that their algebraic sense of movement in either direction, that is, plus or minus, must be considered. The important feature is that each malalignment-sensitive reflecting means exerts an effect on the beam proportional to the malalignment of the element which it checks.

The transfer means preferably are isosceles prisms of the same configuration as those utilized for the malalignment-sensitive reflecting means, and will provide the same kind of displacement and deviation. It will be particularly appreciated that, since the stand 22 is set up so that the glass plate is exactly perpendicular to the incident rays 36, and therefore to the reference axis 35a, the deviation between the emergent beam 40 and the reference axis 35a caused by the transfer means will always be equal to the angle between the incident ray 39 and the reference axis 35a. This is merely another way of saying that in these isosceles prisms, the angle of incidence is equal to the angle of reflection. In the case of transfer means, they are always accurately aligned with the reference axis so that the reference axis coincides with the normal to plane 39, and the reference axis bisects the angle between the incident and reflected (emergent) rays, while in the case of the malalignment-sensitive reflecting means, this is not necessarily the case.

Both the malalignment-sensitive reflecting means and the transfer means have the same reflecting property as a plane mirror with respect to angular deviation, and in addition have the property of laterally displacing the emergent ray from the incident ray. In fact, ordinary plane mirrors could be used for this type of optical checking, except that then there would not be room for all of the necessary reflecting and transfer means, since no provision would be made for lateral displacement of the rays.

It will now be appreciated that the deviation of the rays which results from the position of a first malalignment-sensitive reflecting means is exactly transmitted by the transfer means to a second of such malalignment-sensitive reflecting means in the form of a ray which makes an exactly equal angle with the reference axis, but is on the opposite side of the normal to the transfer means. The second malalignment-sensitive reflecting means, depending on its orientation (which is determined by the alignment of the port) might increase or decrease the amount or direction of deviation, or leave it unchanged. After all of the prisms have been traversed, the rays leave the second of the isosceles prisms under the autocollimator objective lens with some resultant deviation from the rays 36, which deviation is proportional to the magnitude, and is also in the direction of the cumulative vectorial error in manufacture of all the ports or other presumably aligned elements.

It will be appreciated that a plate might be provided with purposely misaligned elements, and then this optical system can be utilized to check the cumulative accuracy of manufacture.

Both the transfer means and the malalignment-sensitive reflecting means are devoid of any image rotation property. Their common property is the sideward displacement of the ray, and the angular deviation of a ray by an angle equal to twice the angle between a normal to the reflecting surface and the incident ray. Rotation of these prisms with respect to the reference axis will cause the emergent ray to move, but it will not rotate and the ray will still emerge with the same angular orientation relative to the reference axis, regardless of the rotation of the prism around the reference axis.

The criterion for the malalignment-sensitive reflecting means and transfer means is that there must be an odd number of reflections, so that the reflected ray is directed generally back toward the incident ray. Also, where the reflecting means has surfaces at which refraction may take place, there must be an even number of such refracting surfaces. Because a mathematical relationship of the first order is desired for this instrument, all of these surfaces of an individual means are made perpendicular to a reference plane. This perpendicularity to a reference plane applies to individual means and does not import that in the device as set up every reflecting surface in every prism is perpendicular to the same plane.

From these criteria, it will be appreciated that while an isosceles prism with three reflecting surfaces has been shown as a preferred embodiment, more or fewer could have been provided, and more than one reflection could have been caused to occur at a single reflecting surface. If more than one reflection occurs at a single reflecting surface, then, according to this definition, such reflecting surfaces would count as more than one surface.

The difference between the reflecting means of Fig. 4 and of Fig. 6 is that the sideward displacement of the rays in Fig. 4 is primarily caused by multiple reflections, while in the prism of Fig. 6, it is primarily caused by a refraction within the prism. When isosceles means are provided, then all the angular deviations in any plane will be exactly equal to twice the number of degrees between an incident ray and the normal to the principal reflecting face. When the initial incident ray is parallel to the reference axis, and the principal reflecting faces are all perpendicular to the axis of the element with which each is associated, then the angular deviations will be a direct measure of the malalignment of the element.

The inspection set-up problem when this optical system is used is reduced to keeping the surfaces of plate 23 perpendicular to the reference or true axis, and thereby retaining the transfer means in a similarly aligned position. This is a simple matter of accurate jig and fixture manufacture. The stand 22 will automatically hold the plate 23 parallel to plate 13, and the plate 23 need only be turned so that transfer means span the space between pairs of adjacent malalignment-sensitive reflecting means, save one pair, and so that the autocollimator objective lens spans that other pair. In the event that only one element is being checked, no transfer means is used, and the autocollimator objective lens simply spans the apertures 37 and 38 of the single malalignment-sensitive reflecting means which is used. The plugs must, of course, be installed carefully so that their axis coincides with the axis of the element whose alignment is being checked.

The optical readout system comprises the eyepiece and the target reticle. This reticle may have a pattern on it, such as a circle, and this circular pattern will be cast as an image toward the plate 23. There will be a reflection of this image from the upper surface of the plate, and if the incident light rays 36 are parallel to the reference axis 35a, then this first image reflection will be cast back to be centrally located in the eyepiece. In fact, this provides a convenient means for checking the alignment of the collimator lens and the plate 23 should the rays be desired perpendicular to the plate. It will be appreciated, however, that it is no limitation on the invention that the rays 36 should be perpendicular to said plate. Any non-perpendicularity will simply move the first reflected image sidewise in the eyepiece, and cause an equal sidewise movement of the image which has traversed the optical system. This freedom from critical alignment of the incident light rays is another advantage of this invention.

The light rays which traverse the entire optical system and return to the eyepiece also carry the target image, and this returned image will be displaced from the image reflected from the upper surface of plate 23 proportionally to the malalignment of the elements. If the target is sized in proportion to the permissible malalignment, the inspection process may simply comprise observation to determine whether the target image returned through the system intersects with the image reflected from the plate 23. As stated above, this test will give true results even if the incident rays 36 are non-parallel to the reference axis 35a, although a parallel relationship is to be preferred.

If a pattern is used on the reticle, then this instrument is conveniently usable as a "go" and "no go" means for determining the manufactured accuracy of the product.

The inspection process therefore comprises the careful insertion of the plugs in the ports, and placing the housing 20 over the plate 23 so that the autocollimator objective lens spans a pair of malalignment-sensitive reflecting means. The objective lens will look directly down on an aperture 37 of one prism, and on the aperture 38 of another. The stand is positioned so that the transfer means span the other pairs of malalignment-sensitive reflecting means. The light source is illuminated, and the position of the returned image, which has passed through the above-described path is observed.

While solid prisms have been shown for the various reflecting and transfer means, it will be appreciated that their important feature is the reflecting surfaces, and that mirrors could be used instead of the solid prism, the mirrors being appropriately spaced to correspond to the reflecting surfaces in the prisms. However, the greater ruggedness of the solid prisms recommends their use, particularly when the instrument is to be used in factories.

Taking into account the light absorption losses as well as the losses by reflection at surfaces intended to transmit light, it has been computed that the system shown in the drawings will finally return between 8% and 12% of the incident light to the autocollimator eyepiece.

The optical system of this invention may conveniently be incorporated into a production-type instrument. The only factor limiting the speed of its use is the rapidity with which the isosceles prisms may be aligned with the central axis of the ports or other elements being checked. Therefore, more than one position on the table may be provided for use with one autocollimator, and two operators may work on the instrument at the same time, one setting up the isosceles prisms in the plates, and the other reading the results.

While an inspection device for checking four ports has been shown, it is to be understood that more or fewer could be checked by providing malalignment-sensitive reflecting means for each element, and one less transfer means than elements. Thus, in checking only one element, no transfer means would be used, the rays from a single prism being sufficient for the task. For more than one element, the transfer means are needed when the vector sum is to be determined in one operation.

The invention is not to be limited by the example shown in the drawings, and described in the description, which is given by way of illustration and not of limitation, but only in accordance with the scope of the appended claims.

I claim:

1. An optical system for determining the resultant alignment error of a plurality of presumably aligned, laterally spaced, elements with respect to a reference axis, said elements each having a central axis, said system comprising: a source of initial incident parallel light rays; malalignment-sensitive reflecting means for each element to be checked each having a reflecting planar surface; means for holding each malalignment-sensitive reflecting means so that said reflecting planar surface is perpendicular to the central axis of the element whose malignment is to be checked by that particular malalignment-sensitive reflecting means; means in each of said malalignment-sensitive reflecting means for displacing sidewise a ray incident thereon, whereby there is produced in each malalignment-sensitive reflecting means an emergent ray which is displaced sidewise from an incident ray, and in which the angle of incidence equals the angle of reflection, and in which the angle between the reference axis and the emergent ray differs from the angle between the reference axis and the incident ray by an increment which is a function of the malalignment of the central axis of the element whose malalignment is checked by the respective malalignment-sensitive reflecting means, one of said malalignment-sensitive reflecting means being positioned so as to receive said incident parallel rays; one less transfer means than elements to be checked, each transfer means having a reflecting planar surface; means for holding said transfer means over the malalignment-sensitive reflecting means so that each transfer means spans the space between two adjacent malalignment-sensitive reflecting means, with the said reflecting planar surface of the transfer means perpendicular to the reference axis; means in each of said transfer means for displacing a ray sidewise incident thereon, whereby there is produced an emergent ray which makes an angle with the reference axis which is equal to the angle between the rays incident thereon and the reference axis, and which is displaced sidewise from said incident rays; and means for receiving light rays from one of said malalignment-sensitive reflecting means and determining the resultant deviation of said rays which have passed through all of the malalignment-sensitive reflecting means and transfer means in the optical system, from the initial incident parallel light rays, whereby the total resultant alignment error of the central axes of the elements may be determined from the said resultant deviation.

2. An optical system according to claim 1 in which the incident parallel light rays are parallel to the reference axis.

3. An optical system according to claim 1 in which each malalignment-sensitive reflecting means, and each transfer means, comprises an isosceles prism, each of said prisms having an odd number of reflecting surfaces, and an even number of refracting surfaces, the said surfaces in each prism being perpendicular to a common plane.

4. An optical system according to claim 1 in which each malalignment-sensitive reflecting means comprises an isosceles prism, each of said prisms having a first surface perpendicular to the central axis of the element to be checked, and having two other reflecting surfaces, both of said other reflecting surfaces making equal dihedral angles with said first surface, the said surfaces in each prism being perpendicular to a common plane.

5. An optical system according to claim 4 in which said first surface is farther from the element to be checked than the other two surfaces, whereby the sidewise displacement of an incident ray is caused by reflection from the three surfaces.

6. An optical system according to claim 4 in which said first surface is closer to the element to be checked than the other two surfaces, whereby the sidewise displacement of an incident ray is caused by refraction at said other two surfaces, and reflection at said first surface.

7. An optical system according to claim 4 in which a transparent plate having parallel surfaces perpendicular to the reference axis has the transfer means affixed to its surface nearest the elements to be checked, said plate also being disposed between the light source and the elements to be checked whereby the incident parallel light rays pass through said transparent plate, and whereby the transfer means are held in alignment with respect to said reference axis.

8. An optical system according to claim 7 in which said incident light rays are parallel to said reference axis.

9. An optical system according to claim 7 in which the light source is provided with a target, whereby reflections from the transparent plate can be compared with rays which have passed through the optical system for determining the resultant deviation of the latter rays.

10. An optical system for determining the resultant alignment error of a plurality of presumably aligned, laterally spaced, elements with respect to a reference axis, said elements each having a central axis, said system comprising: an autocollimator for projecting initial incident parallel light rays; malalignment-sensitive reflecting means for each element to be checked, for producing an emergent ray which is displaced sidewise from an incident ray, and in which the angle of incidence equals the angle of reflection, and in which the angle between the reference axis and the emergent ray differs from the angle between the reference axis and the incident ray by an increment which is a function of the malalignment of the central axis of the element whose malalignment is checked by the respective malalignment-sensitive reflecting means; one of said malalignment-sensitive reflecting means being positioned so as to receive said initial incident parallel rays, each of said malalignment-sensitive reflecting means comprising an isosceles prism having a first surface disposed perpendicular to the central axis of the element whose alignment it is to check, and having two other reflecting surfaces, both making equal dihedral angles with said first surface, all of said surfaces being perpendicular to a common plane, said first surface being farther from the element than said other two surfaces; means for aligning and holding the isosceles prisms so that said first surface is perpendicular to the axis of the element with which it is associated; one less transfer means than elements to be checked, for producing an emergent ray which makes an angle with the reference axis which is equal to the angle between the rays incident thereon and the reference axis, and which is displaced sidewise from said incident ray, each transfer means being disposed so as to span the space between two adjacent malalignment-sensitive reflecting means, said transfer means each comprising an isosceles prism with the configuration of the malalignment-sensitive reflecting means; means for holding each transfer means above the malalignment-sensitive reflecting means which it spans, with its said first surface disposed perpendicular to the reference axis; said autocollimator being disposed so as to span the space between one pair of adjacent malalignment sensitive reflecting means not spanned by the transfer means, and means for receiving light rays from one of said malalignment sensitive reflecting means and focusing said rays which have passed through all the transfer means and malalignment-sensitive reflecting means in the system in alternate succession; and comparator means for receiving said rays and determining the resultant deviation of said rays from the incident parallel light rays, whereby the total resultant alignment error of the central axes of the elements may be determined from the said resultant deviation.

11. An optical system according to claim 10 in which the incident parallel light rays are parallel to the reference axis.

12. An optical system according to claim 10 in which the comparator means comprises a target in the autocollimator.

References Cited in the file of this patent

UNITED STATES PATENTS

| | | |
|---|---|---|
| 2,055,684 | Eppenstein | Sept. 29, 1936 |
| 2,692,527 | Wetzel et al. | Oct. 26, 1954 |
| 2,703,505 | Senn | Mar. 8, 1955 |
| 2,759,393 | McLeod | Aug. 21, 1956 |

FOREIGN PATENTS

| | | |
|---|---|---|
| 284,120 | Switzerland | Nov. 1, 1952 |